(12) United States Patent
Chikovani et al.

(10) Patent No.: US 9,322,655 B2
(45) Date of Patent: Apr. 26, 2016

(54) AXIALLY SYMMETRICAL CORIOLIS FORCE GYROSCOPE (VARIANTS)

(75) Inventors: Valery Valerianovich Chikovani, Kiev (UA); Yurii Alekseevich Yatzenko, Kiev (UA)

(73) Assignee: INNALABS LIMITED, Dublin (IE)

( * ) Notice: Subject to any disclaimer, the term of this patent is extended or adjusted under 35 U.S.C. 154(b) by 533 days.

(21) Appl. No.: 14/112,921

(22) PCT Filed: Nov. 19, 2010

(86) PCT No.: PCT/RU2010/000683
§ 371 (c)(1),
(2), (4) Date: Oct. 19, 2013

(87) PCT Pub. No.: WO2012/067534
PCT Pub. Date: May 24, 2012

(65) Prior Publication Data
US 2014/0102193 A1    Apr. 17, 2014

(51) Int. Cl.
*G01C 19/56* (2012.01)
*G01C 19/5691* (2012.01)

(52) U.S. Cl.
CPC ............ *G01C 19/56* (2013.01); *G01C 19/5691* (2013.01)

(58) Field of Classification Search
CPC .................................................. G01C 19/5691
USPC ....................................................... 75/504.13
See application file for complete search history.

(56) References Cited

U.S. PATENT DOCUMENTS

| 4,157,041 | A  | * | 6/1979 | Loper, Jr. | ............ | G01C 19/5691 73/504.13 |
| 6,662,656 | B2 | * | 12/2003 | Jeanroy | .............. | G01C 19/5691 73/504.13 |
| 7,513,156 | B2 | * | 4/2009 | Chikovani | .......... | G01C 19/5691 73/504.13 |
| 7,607,350 | B2 | * | 10/2009 | Choi | .................... | H05K 7/1417 73/493 |

\* cited by examiner

*Primary Examiner* — John Chapman, Jr.
(74) *Attorney, Agent, or Firm* — Bardmesser Law Group

(57) ABSTRACT

An axially symmetrical Coriolis vibratory gyroscope includes a thin-walled resonator with a hemispherical or cylindrical or toroidal form, the resonator being fixed at the center to a support and being formed with openings in that wall of the resonator which is located around the support, the number of openings being determined on the basis of the formula 4nk, where k is an integer, n is the order of oscillation modes, wherein the support has a symmetrical form along the longitudinal axis and is fixed to a base, electrodes are positioned on the wall of the resonator or next to the resonator for exciting and measuring two oscillation modes, a constant amplitude of one of the modes is maintained and a secondary oscillation mode which is sensitive to Coriolis forces is monitored, and the base is provided with a seat for the support of the resonator and with electrically insulated hermetically sealed leads which pass outwards via the base and through the openings in of the resonator.

10 Claims, 4 Drawing Sheets

AXIALLY SYMMETRICAL CORIOLIS FORCE GYROSCOPE (VARIANTS)

FIELD OF TECHNOLOGY

The invention relates to gyroscopic instrument engineering and can be used for measuring angular velocities and rotation angles relative to inertial space within systems for orientation, navigation and control of motion. The invention relates to Coriolis vibratory gyroscopes and in particular to axisymmetrical gyroscopes based on cylindrical or hemispherical resonators.

DESCRIPTION OF THE RELATED ART

The gyroscope is an instrument for measuring or maintaining orientation. Gyroscopes are used inter alia in inertial navigation systems (INS), stabilization of terrestrial means of transport, aircraft, ships, optical guidance axes, position finding etc. Standard vibratory gyroscopes are described in the following U.S. Pat. Nos. 6,698,271, 7,120,548, 7,240,533, 7,216,525, 7,281,425, 5,597,955. CVG technology is preferable for use in inertial systems owing to its low cost, simple manufacture, reliability in comparison with gyroscopes of other types, such as ring laser gyroscopes (RLG) and fibre-optic gyroscopes (FOG). CVGs of low and medium accuracy are mainly gyroscopes of MEMS (microelectromechanical sensors). Some of them are already used in industrial and civil applications, and are also mass-produced for the automobile market. Gyroscopes for MEMS are mainly based on quartz resonators fabricated in accordance with the standards and development of microelectronics. They are widely used owing to their low price and compactness, but for several reasons their accuracy is inadequate (or difficult to achieve) for certain tactical and navigational purposes.

High accuracy is achieved with gyroscopes with resonators with high quality factor (Q>10000, $2/\tau=\omega/q$, where w is the natural frequency of the resonator, Q is the quality factor of the resonator, T is a time constant, according to standard IEEE 1431) with strict axial symmetry. Typical forms are the ring, hemisphere and cylinder, and the vibration modes employed are usually second-order vibrations (i.e., elliptical form). Attainment of the required results, based on these ring-shaped resonators, is much easier with second-order vibration, but other orders of vibrations may develop. One of the best known gyroscopes, belonging to the high-accuracy category, is HRG (hemispherical gyroscope with quartz resonator). HRGs display accuracy comparable to or even surpassing the accuracy of RLG and FOG owing to the use of quartz glass with high Q-factor as the material of the resonator.

In axisymmetrical resonators, such as ring, cylindrical or hemispherical, it is best to excite the elastic wave according to the second mode of resonator vibrations with specified amplitude, which is stabilized by a system for automatic gain control (AGC). This standing wave has four antinodes and nodes of the vibrations, where the amplitude of the vibrations is maximum and minimum, respectively. Rotation about the input axis of the vibrating structure creates Coriolis forces: $Fc=2m[\Omega \times V]$, where Fc is the Coriolis force vector, m is the modal mass of the resonator, $\Omega$ is the vector of the angular velocity with respect to the input axis of the resonator, and V is the vector of the linear velocity of the elements of the structure (during vibration). The sign × denotes the vector product (multiplication). The Coriolis forces activate the measured mode of the vibrations (its amplitude is proportional to the angular velocity of rotation). The measured mode is located at an angle of 45° to the excited mode so that its nodes are located on the antinodes of the excited mode. Signals proportional to the angular velocity of rotation are read from electrodes located on the nodes of the excited mode. To increase the frequency range of the gyroscope it is necessary to provide rapid damping of the measured mode. Damping of the measured mode is nearly always performed using electronics for force balancing of the wave, i.e., the signal of the measured mode is taken from electrodes located on the nodes of the excited mode and, through negative feedback, is fed to another electrode, located on the node of the excited mode. This leads to damping of the vibrations, i.e., decrease in the quality factor of the measured mode and correspondingly to an increase in the frequency range of the gyroscope. The feedback signal is proportional to the angular velocity of rotation about the measurement axis.

High-accuracy Coriolis vibratory gyroscopes will now be examined. As mentioned previously, axisymmetrical resonators of cylindrical or hemispherical shape, made of material with a high Q-factor, are mainly used in such gyroscopes. Regarding the dimensions of these gyroscopes, it should be pointed out that the total dimensions greatly exceed the actual size of the resonator itself. This is shown in the following patents: U.S. Pat. Nos. 7,281,4252, 3,656,354, 2005/0126257. In practice these gyroscopes have much larger dimensions than MEMS gyroscopes, regardless of their configurations, "cup" (stem outside) or "mushroom" (stem inside).

In the device according to U.S. Pat. No. 4,644,793 (taken as the prior art), the resonator consists of a cylindrical shell, extending from a flat flexible plate, or membrane, on which it is fastened. On excitation of this plate it deforms the shell, and excites radial vibrations in it. On rotation of said resonator about its axis, the nodes of the vibrations move around the circumference of the shell owing to the action of Coriolis forces. These displacements of the wave pattern are transmitted to the plate on which the cylindrical shell is fastened. Sensing transducers, of the capacitance type in said prior art, record these displacements, and the angular velocity is determined from the change in amplitude of vibrations in the node.

Taking into account that MEMS gyroscopes cannot achieve high accuracy, or this is problematic, there is a need to reduce the size of CVGs with an axisymmetrical resonator of cylindrical or hemispherical shape. If the size of the gyroscope is reduced by reducing the size of the resonator, there will be a decrease in Q-factor of the resonator, and correspondingly in the accuracy of the gyroscope. The base on which the stem is fastened is nearly always a metal component with a hermetic glass joint. If the size of the resonator is reduced, the size of the base must also be reduced. However, with a large number of contacts (sealed leads), yet another restriction appears. It should also be pointed out that as the number of metallic sealed leads increases, the cost of the gyroscope also increases, and its reliability decreases (owing to leakage of gas).

SUMMARY OF THE INVENTION

The present invention aims to achieve a technical result that consists of decreasing the overall dimensions of an axisymmetrical Coriolis vibratory gyroscope, such as a cylindrical or hemispherical CVG, without employing the principle of reducing the size of the resonator. Moreover, the technical result also involves improvement of the technological effectiveness of the design, in particular by reducing the number of sealed leads in the base, which also increases the reliability of the gyroscope and makes it possible to reduce its size.

In a first practical example, the aforementioned technical result is achieved in that an axisymmetrical Coriolis vibratory gyroscope comprises a thin-walled resonator of hemispherical or cylindrical or toroidal shape, fastened centrally on the stem and made with holes in the resonator wall, arranged around said stem, the number of which is determined from the formula "4nk", where "k" is an integer, "n" is the order of the vibration modes, and the angle between two adjacent holes is equal to "π/2nk", wherein said stem is made symmetrical along its longitudinal axis and is fastened on a base, electrodes are arranged on the wall of the resonator or alongside it for excitation and measurement of two vibration modes, the constant amplitude of one of the modes of which is intended for monitoring a secondary vibration mode that is sensitive to Coriolis forces, and the base is made with a seating for the resonator stem and electrically-insulated sealed leads, led out through the base to the outside and passing through the holes in the resonator wall for connecting to the elements of an electronics circuit board.

In a second practical example, the aforementioned technical result is achieved in that the axisymmetrical Coriolis vibratory gyroscope comprises a thin-walled resonator of hemispherical or cylindrical or toroidal shape, fastened centrally on the stem and made with holes in the resonator wall, arranged around said stem, the number of which is determined from the formula "4nk", where "k" is an integer, "n" is the order of the vibration modes, and the angle between two adjacent holes is equal to "π/2nk", moreover said stem is made symmetrical along its longitudinal axis and fastened on the base, electrodes are arranged on the resonator wall or alongside it for excitation and measurement of two vibration modes, the constant amplitude of one of the modes of which is intended for monitoring a secondary vibration mode that is sensitive to Coriolis forces, and the base is made with a seating for the resonator stem and electrically-insulated sealed leads, led out through the base to the outside and intended for connecting to the elements of an electronics circuit board, which is housed in a cavity inside the resonator and is fastened to electrically-insulated sealed leads that are connected to it through metallized holes.

In a third practical example the aforementioned technical result is achieved in that an axisymmetrical Coriolis vibratory gyroscope comprises a thin-walled resonator of hemispherical or cylindrical or toroidal shape, fastened centrally on the stem and made with holes in the resonator wall, arranged around said stem, the number of which is determined from the formula "4nk", where "k" is an integer, "n" is the order of the vibration modes, and the angle between two adjacent holes is equal to "π/2nk", moreover said stem is made symmetrical along its longitudinal axis and fastened on the base, solenoids and electrodes are arranged on the resonator wall or alongside it for excitation and measurement of two vibration modes, the constant amplitude of one of the modes of which is intended for monitoring a secondary vibration mode that is sensitive to Coriolis forces, and the base is made with a seating for the resonator stem and electrically-insulated sealed leads, led out through the base to the outside and passing through the holes in the resonator wall for connecting to the elements of an electronics circuit board, which is positioned outside the resonator and is fastened to electrically-insulated sealed leads that are connected to it through metallized holes.

BRIEF DESCRIPTION OF THE ATTACHED DRAWINGS

The essence of the invention is illustrated in FIGS. 1-11, where:

BEST VARIANTS OF CARRYING OUT THE INVENTION

According to the present invention, the design of a compact axisymmetrical Coriolis vibratory gyroscope is examined, which comprises a thin-walled resonator of hemispherical or cylindrical or toroidal shape, fastened centrally on the stem and made with holes in the resonator wall, arranged around said stem, the number of which is determined from the formula "4nk", where "k" is an integer, "n" is the order of the vibration modes, and the angle between two adjacent holes is equal to "π/2nk", moreover said stem is made symmetrical along its longitudinal axis and fastened on the base, electrodes are arranged on the resonator wall or alongside it for excitation and measurement of two vibration modes, the constant amplitude of one of the modes of which is intended for monitoring a secondary vibration mode that is sensitive to Coriolis forces, and the base is made with a seating for the resonator stem and electrically-insulated sealed leads, led out through the base to the outside and passing through the holes in the resonator wall for connecting to the elements of an electronics circuit board.

In one embodiment the electronics board is arranged outside the transducer, in another embodiment the electronics board is housed in the cavity inside the resonator and is fastened to electrically-insulated sealed leads that are connected to it, through metallized holes 13. In a third embodiment the electronics board is arranged outside the resonator and is fastened to electrically-insulated sealed leads that are connected to it and are secured in the base through metallized holes. Moreover, embodiments of the resonator in the form of a thin-walled hemispherical or cylindrical or toroidal configuration are examined.

Concrete implementations of this gyroscopic sensor are examined below.

Figure 1:
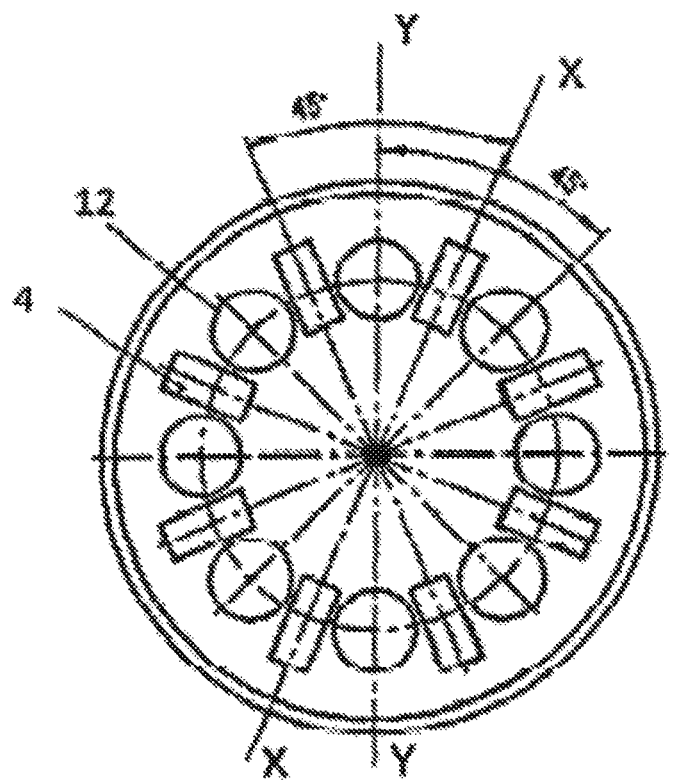
FIG. 1 is a horizontal projection of a cylindrical or hemispherical resonator with measuring and exciting electrodes, with 8 holes. The size and position of the electrodes are selected so as to obtain signals required for the control electronics.
Figure 5:
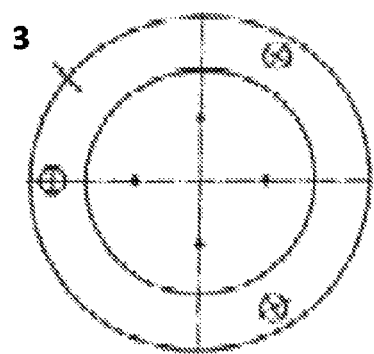
FIG. 5 is a horizontal projection of the base with four sealed leads.

FIG. 1 shows the holes in the bottom of the resonator, arranged in a circle with respect to the input axis of a cylindrical or hemispherical resonator. In this case we have 8 holes and 8 electrodes, arranged symmetrically between the holes. The electrodes are located on the outside of the resonator. The angle between each adjacent pair of holes is equal to 45°. The electrodes are preferably made of piezoceramic plates, but in a hemispherical resonator made of quartz these electrodes can be capacitors, which supply electrostatic forces. An example of a CVG with a cylindrical resonator is shown in FIGS. 2 and 5.

Figure 2:
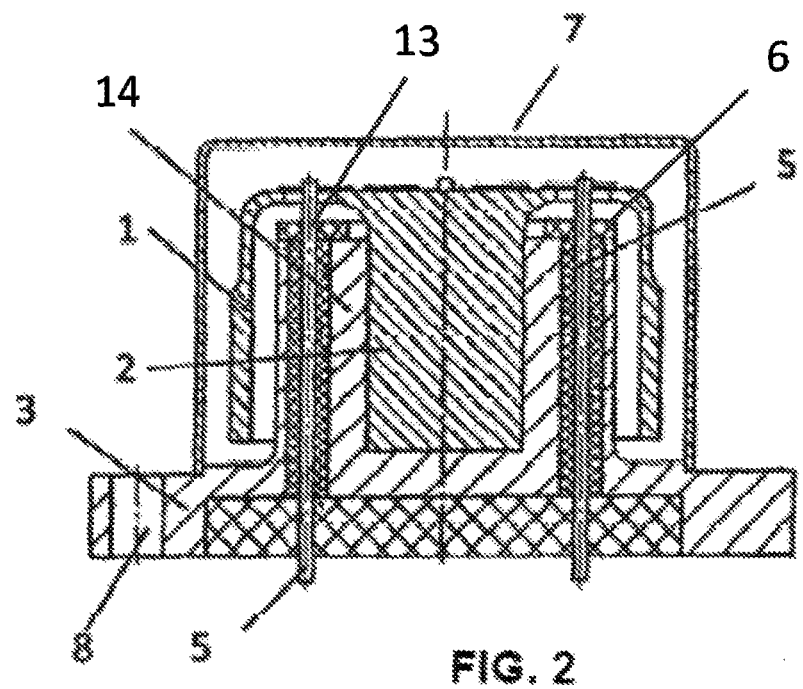
FIG. 2 is a variant of construction of the gyroscope with a connecting electronics board inside a cylindrical resonator.

Elements shown in FIG. 2: cylindrical resonator 1, made in the form of a thin-walled cup with a cylindrical lateral wall, secured on a stem 2 of a mushroom shape (or some other cylindrical shape), base 3 with component 14 inside the resonator 1, which is a cup-shaped projection, into which the resonator stem is inserted, electrodes 4 are made of piezoceramic, in order to excite and measure the required vibrations, as well as measure their parameters, pin electrodes 5 (hereinafter: electrically-insulated sealed leads 5) for lead-in/lead-out of signals through base 3, the connecting electronics board 6 with conductor strips provides connection between the electrodes and the sealed leads (board 6 is connected by leads to the electrodes), cylindrical (cylinder-shaped or mushroom-shaped) stem 2, located inside the resonator (fastened to it or made in one piece with it), serves as fastening of resonator 1 to base 3, cap 7 covers the resonator and maintains the specified pressure inside (however, it should preferably be a vacuum), holes 8 are used for locating the gyroscope in the unit (for example IMU, i.e., inertial measuring unit). The stem should preferably be made in the form of a solid or partially hollow cylinder. Holes for passing the pin electrodes 5 through are made in component 14.

Figure 3:
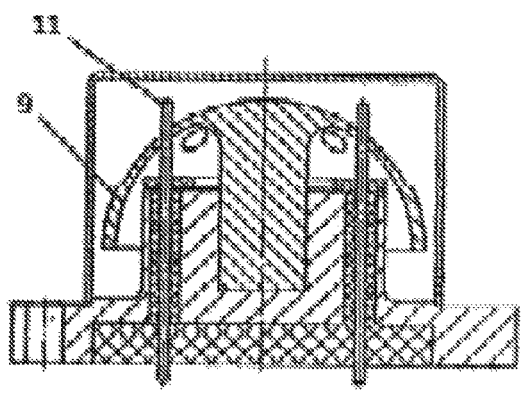
FIG. 3 is a variant of construction of the gyroscope with a connecting electronics board inside a hemispherical resonator.
Figure 4:
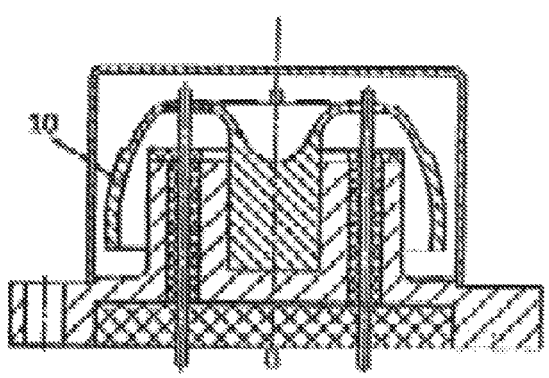
FIG. 4 is a variant of construction of the gyroscope with a connecting electronics board inside a toroidal (hemispherical flat-bottomed) resonator.

FIGS. 3 and 4 show practical examples of a Coriolis vibratory gyroscope with hemispherical 9 and toroidal 10 resonator, respectively. The overall dimensions of these gyroscopes are the same as for the gyroscope shown in FIG. 2. In this configuration, as shown in FIGS. 2-4, it is possible to achieve the following overall dimensions: height 25 mm, diameter 30 mm (including cap). However, it is also possible to obtain a smaller size, with height less than 10 mm, which is comparable to the body of a MEMS.

The dimensions of the gyroscope are minimized by using holes in the bottom and a space inside the resonator. This space is filled with a base for fixation of the resonator by means of sealed leads, as well as a connecting electronics board 6. As a result it becomes possible to minimize not only the height of the gyroscope, but also its diameter, approaching the corresponding dimensions of the resonator.

Figure 6:
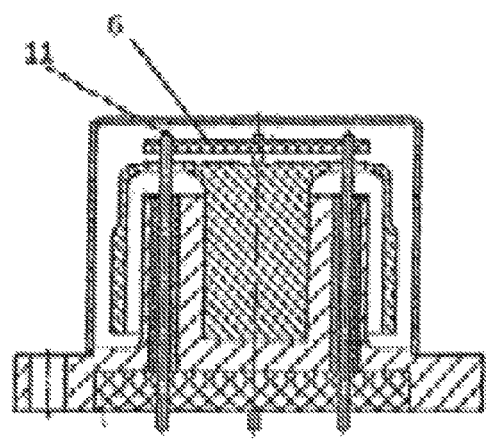
FIG. 6 is a variant of construction of the gyroscope with a connecting electronics board outside a cylindrical resonator.
Figure 7:
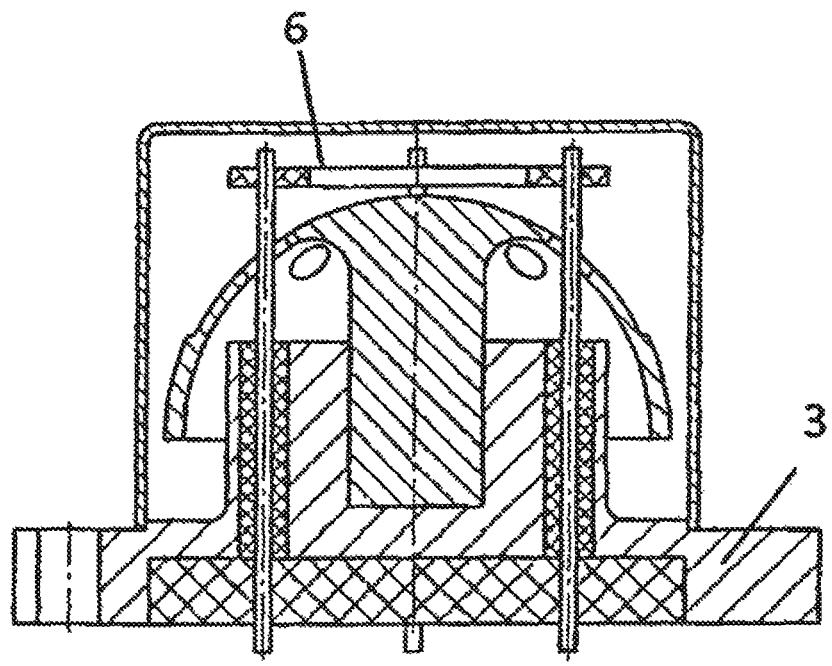
FIG. 7 is a variant of construction of the gyroscope with a connecting electronics board outside a hemispherical resonator.
Figure 8:
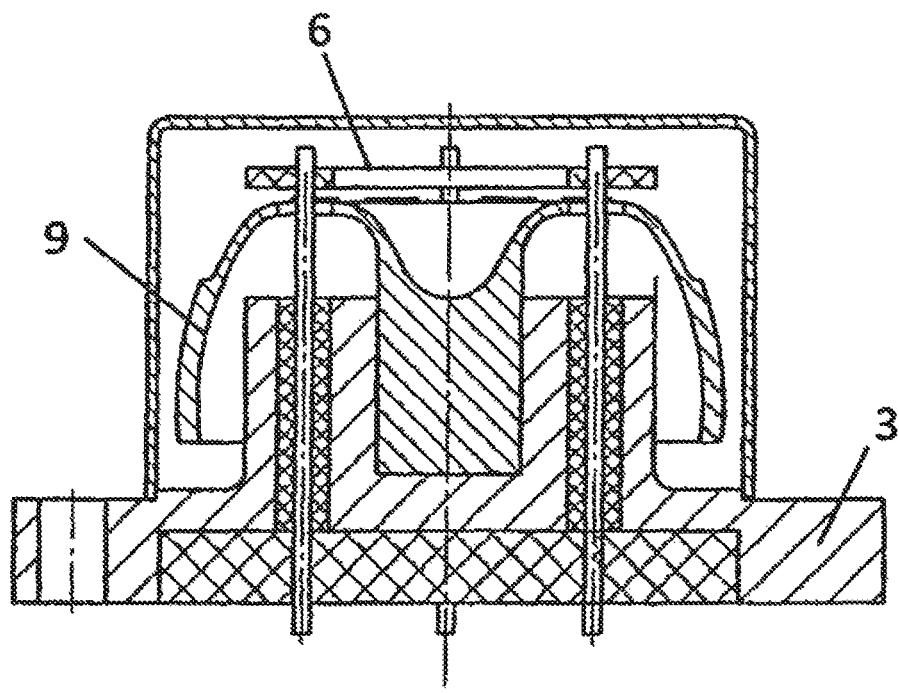
FIG. 8 is a variant of construction of the gyroscope with a connecting electronics board outside a toroidal (hemispherical flat-bottomed) resonator.

FIGS. 6-8 show sectional views of cylindrical, hemispherical and toroidal gyroscopes with a connecting electronics board 6, located above the resonator 1 or 9 or 10. Similar elements shown in FIGS. 6-8 are the same as in FIGS. 2-4. In these cases, in base 3 the sealed leads 5 are made elongated with projections 11, which pass through the holes 12 in the resonator, which makes it possible to position board 6 above resonator 1 or 9 or 10 and secure it on the base.

Figure 9:
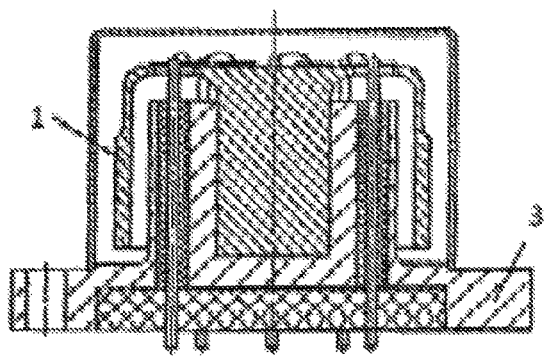
FIG. 9 is a variant of construction of the gyroscope without an internal connecting electronics board and with a cylindrical resonator.
Figure 10:
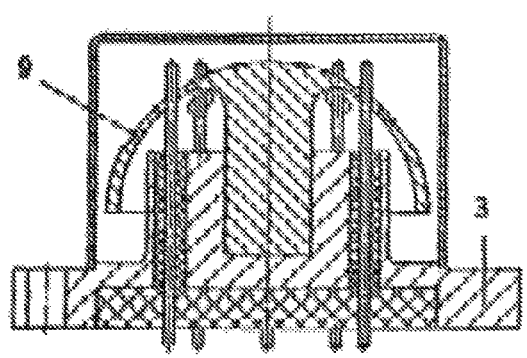
FIG. 10 is a variant of construction of the gyroscope without an internal connecting electronics board and with a hemispherical resonator.
Figure 11:
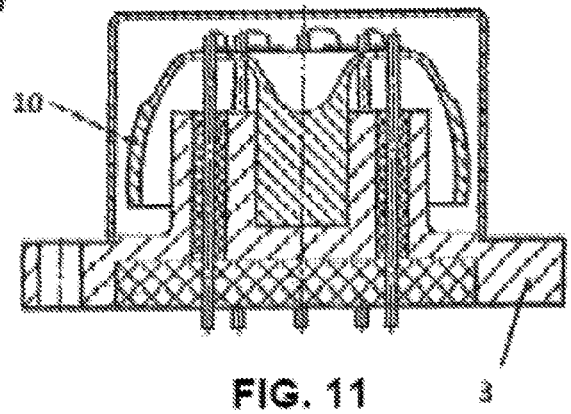
FIG. 11 is a variant of construction of the gyroscope without an internal connecting electronics board and with a toroidal (hemispherical flat-bottomed) resonator.

FIGS. 9-11 show a sectional view, without connecting electronics, of gyroscopic sensors according to the new embodiment. In this design the sealed leads 5 for lead-in/lead-out pass through the holes 12 in the resonator. The conductive connection provides direct electrical connection of the electrodes with the sealed leads. This design variant is less expensive than the two presented above. The height of the gyroscope remains the same as in the preceding variants. However, the decrease in size is limited by the number of sealed leads in the base.

Based on these examples, an algorithm can be specified for constructing a design for compact high-accuracy Coriolis vibratory gyroscopes with ring resonators in the form of a cylinder or hemisphere: holes in the bottom, arranged in a circle, preferably 8 in number, with 45° spacing, stem inside the resonator (mushroom shape); the resonator is mounted by means of the stem on the base, located inside a cup-shaped projection; connection between the electrodes of the resonator and the sealed leads is provided by a connecting lead directly to the sealed leads through the holes, or alternatively by means of a connecting electronics board. The connecting electronics board makes it possible to reduce the number of sealed leads.

In the present invention, in a Coriolis vibratory gyroscope (CVG), and in particular in an axisymmetrical gyroscope, the technical result is achieved as a result of the following implementation design features:

In one of the variants of the present invention, holes are made in the bottom of the resonator, and the stem is located inside ("mushroom" shape).

The desirable number of holes is 8, in the second order of exciting mode. However, there can be many more holes. Let "n" be the order of the modes, and specify the number of holes with the equation "4nk", where "k" is an integer. At "n=2" and "k=1", the number of holes is equal to 8.

Regarding the conditions of symmetry, the angle between two adjacent holes will be "π/2nk". This angle also determines the position of the axes of symmetry of the resonator (in a plane perpendicular to the input axis of the resonator). At "n=2", the angle is equal to 45°.

It is best to make the stem in the form of a solid or partially hollow cylinder, but it need not necessarily be a right cylinder, it is possible to use other symmetrical shapes, taking second-order vibrations into account (for example, the right section of the stem can be an octagon in the second order of vibration, i.e., the second order leads to elliptical forms of modes).

In the base there is a blind hole, directed into the resonator. This hole provides fixing of the resonator by means of the free end of the stem. This fixing is located inside the resonator, with maximum filling of the space within it.

Besides this, an electronic circuit is connected to the sealed leads in the base. It is desirable to arrange this inside the resonator, to minimize the size of the gyroscope. This electronic circuit provides electrical connection of the electrodes of the resonator, located on its outside (they are used for exciting and measuring vibration), to the sealed leads in the base by means of a connecting lead. Moreover, it is to be understood that these sealed leads in the base are arranged in a circle whose diameter is less than the diameter of the resonator.

In essence, the number of electrodes is determined by the same laws as the number of holes, as was defined above. However, this number can be divided by 2, using techniques of time separation of the signal (one and the same electrode is used alternately for excitation and measurement of vibration). In the case of second order with the original electronic control circuit without the time separation technique, the desired number is equal to 8. In this case it can be seen from the materials of the application that these electrodes need to be connected in pairs. When using electrodes of identical polarity, pairs of opposite electrodes (located at an angle of) 180° are connected together. When using electrodes of opposite polarity, two electrodes located at an angle of 90° are connected together.

In any case, the electronic circuit can be made according to the latest state of the art for providing the electrical connection of the pairs of electrodes. In that case the number of sealed leads can be less than the number of electrodes. In the case of second order the number of sealed leads can be reduced to 4, or to 2 when using time separation electronics. This makes it possible to reduce the size of the base, which is necessary for creating compact CVGs.

It should be pointed out that the version of design with internal electronics above the resonator (rather than inside the resonator) is also entirely suitable, but it is somewhat higher.

By not using internal electronics inside the gyroscope, it is possible to solve yet another problem. In this case leads are soldered directly between the electrodes and the sealed leads in the base, with identical number of sealed leads and resonator electrodes. Connection between the electrodes can be made outside the gyroscope, if necessary, for example in the electronics unit.

As can be seen from the above description, Coriolis vibratory gyroscopes of highest accuracy can be made smaller mainly by using holes in the bottom of the resonator.

INDUSTRIAL APPLICABILITY

The above descriptions of devices only illustrate the present invention and it is not limited to these. Any design modification that preserves the spirit and content of the present invention must be interpreted as conforming to the claims.

It should also be appreciated that various modifications, adaptations and alternative embodiments thereof may be made within the scope and spirit of the present invention. The invention is further defined by the following claims.

What is claimed is:

1. An axisymmetrical Coriolis vibratory gyroscope, comprising:
    a thin-walled resonator having a shape of a hemisphere, a cylinder or a toroid,
    the resonator fastened centrally on a stem and having holes in a wall of the resonator, the holes being arranged around the stem,
    wherein a number of the holes is based on 4nk, where k is an integer, n is an order of a vibration mode, and wherein an angle between two adjacent holes is equal to $\pi/2nk$,
    wherein the stem is symmetrical along its longitudinal axis and is fastened on a base of the resonator;
    a plurality of electrodes arranged on the wall of the resonator or alongside the wall of the resonator, for excitation and measurement of two vibration modes,
    wherein a constant amplitude of one of the vibration modes is used to monitor a secondary vibration mode that is sensitive to Coriolis forces, and
    wherein the base has a seat for the stem and electrically-insulated sealed leads go through the base to an outside of the resonator and pass through the holes in the wall of the resonator for connecting to electronic driving elements.

2. The gyroscope of claim 1, wherein the number of holes is equal to 8, a number of electrically-insulated sealed leads is equal to 8, and on one side the ends of the sealed leads are arranged around each hole.

3. The gyroscope of claim 1, wherein the electrodes are piezoceramic and are attached to the resonator by gluing or soldering.

4. The gyroscope of claim 1, wherein the resonator is made of metal alloys or quartz glass or of crystalline materials with high Q-factor.

5. An axisymmetrical Coriolis vibratory gyroscope, comprising:
    a thin-walled resonator having a shape of a hemisphere, a cylinder or a toroid,
    the resonator fastened centrally on a stem and having holes in a wall of the resonator, the holes being arranged around the stem,
    wherein a number of the holes is based on 4nk, where k is an integer, n is an order of a vibration mode, and wherein an angle between two adjacent holes is equal to $\pi/2nk$,
    wherein the stem is symmetrical along its longitudinal axis and is fastened on a base of the resonator;
    a plurality of electrodes arranged on the wall of the resonator or alongside the wall of the resonator, for excitation and measurement of two vibration modes,
    wherein a constant amplitude of one of the vibration modes is used to monitor a secondary vibration mode that is sensitive to Coriolis forces, and
    wherein the base includes a seating for the stem and electrically-insulated hermetically sealed leads, the sealed leads leading out through the base and connect to an electronic circuit board,
    wherein the electronic circuit board is housed in a cavity inside the resonator and is fastened to the electrically-insulated sealed leads that are secured in the base through metallized holes.

6. The gyroscope of claim 5, wherein the electrodes are piezoceramic and are attached to the resonator by gluing or soldering.

7. The gyroscope of claim 5, wherein the resonator is made of metal alloys or quartz glass or of crystalline materials with high Q-factor.

8. An axisymmetrical Coriolis vibratory gyroscope, wherein the gyroscope comprises a thin-walled resonator of hemispherical or cylindrical or toroidal shape, fastened centrally on a stem and made with holes in a wall of the resonator, arranged around stem, wherein a number of holes is determined from a formula "4nk", where "k" is an integer, "n" is an order of vibration modes, and an angle between two adjacent holes is equal to "$\pi/2nk$", and wherein the stem is made symmetrical along its longitudinal axis and is fastened on a base, wherein electrodes are arranged on the wall of the resonator or alongside the wall of the resonator for excitation and measurement of the vibration modes, a constant amplitude of one of the modes of which is intended for monitoring a secondary vibration mode that is sensitive to Coriolis forces, and the base is made with a seating for the stem and electrically-insulated sealed leads, led out through the base to the outside and passing through the holes in the wall of the resonator for connecting to elements of an electronics circuit board, which is positioned outside the resonator and is fastened to electrically-insulated sealed leads that are connected to it through metallized holes.

9. The gyroscope of claim 8, wherein the electrodes are piezoceramic and are attached to the resonator by gluing or soldering.

10. The gyroscope of claim 8, wherein the resonator is made of metal alloys or quartz glass or of crystalline materials with high Q-factor.

* * * * *